US011283090B2

(12) United States Patent
Han et al.

(10) Patent No.: US 11,283,090 B2
(45) Date of Patent: Mar. 22, 2022

(54) APPARATUS AND METHOD FOR CONTROLLING CONCENTRATION OF EXHAUST HYDROGEN IN FUEL CELL SYSTEM

(71) Applicants: HYUNDAI MOTOR COMPANY, Seoul (KR); KIA MOTORS CORPORATION, Seoul (KR)

(72) Inventors: Jae Ho Han, Suwon-si (KR); Jae Won Jung, Suwon-si (KR); Jai Hyun Ahn, Seoul (KR); Dae Jong Kim, Yongin-si (KR); Hyun Jae Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 2 days.

(21) Appl. No.: 16/927,957

(22) Filed: Jul. 13, 2020

(65) Prior Publication Data
US 2021/0151784 A1    May 20, 2021

(30) Foreign Application Priority Data

Nov. 20, 2019    (KR) .................. 10-2019-0149941

(51) Int. Cl.
*H01M 8/04* (2016.01)
*H01M 8/04746* (2016.01)
*H01M 8/04791* (2016.01)
*H01M 8/04302* (2016.01)
*H01M 8/0444* (2016.01)

(52) U.S. Cl.
CPC ... *H01M 8/04761* (2013.01); *H01M 8/04302* (2016.02); *H01M 8/04455* (2013.01); *H01M 8/04753* (2013.01); *H01M 8/04776* (2013.01); *H01M 8/04805* (2013.01); *H01M 2250/20* (2013.01)

(58) Field of Classification Search
CPC ......... H01M 8/04302; H01M 8/04455; H01M 8/04753; H01M 8/04761; H01M 8/04776; H01M 8/04805; H01M 2250/20; Y02E 60/50
See application file for complete search history.

(56) References Cited

U.S. PATENT DOCUMENTS

2013/0034787 A1* 2/2013 Miyata .............. H01M 8/04447
429/429
2017/0352899 A1* 12/2017 Asai .................. H01M 8/04753

FOREIGN PATENT DOCUMENTS

KR          101748275 B        6/2017

* cited by examiner

*Primary Examiner* — Brittany L Raymond
(74) *Attorney, Agent, or Firm* — McDonnell Boehnen Hulbert & Berghoff LLP

(57) ABSTRACT

The present disclosure relates to an apparatus and a method for controlling a concentration of exhaust hydrogen in a fuel cell system. The apparatus may include an air exhaust valve for discharging hydrogen from a cathode in a fuel cell stack to an outside environment through an air exhaust line, an air compressor for supplying ambient air to the air exhaust line, an air cut-off valve for blocking air supplied to the cathode, and a controller that opens the air exhaust valve and drives the air compressor when starting to supply hydrogen to the fuel cell stack, and opens the air cut-off valve such that a concentration of the hydrogen discharged from the cathode is reduced by air in the air exhaust line when the hydrogen supply is completed.

16 Claims, 6 Drawing Sheets

APPARATUS AND METHOD FOR CONTROLLING CONCENTRATION OF EXHAUST HYDROGEN IN FUEL CELL SYSTEM

CROSS-REFERENCE TO RELATED APPLICATION

This application claims the benefit of priority to Korean Patent Application No. 10-2019-0149941, filed in the Korean Intellectual Property Office on Nov. 20, 2019, the entire contents of which are incorporated herein by reference.

TECHNICAL FIELD

The present disclosure relates to a technology for reducing a concentration of hydrogen (exhaust hydrogen) discharged through an air exhaust line of a fuel cell system.

BACKGROUND

A fuel cell system is a kind of power generation system that converts chemical energy possessed by fuel directly into electrical energy in an electrochemical manner in a fuel cell stack instead of converting the chemical energy into heat by combustion.

The fuel cell system is roughly composed of the fuel cell stack that generates the electrical energy, a hydrogen supplier that supplies hydrogen, which is the fuel, to the fuel cell stack, an air supplier that supplies air (oxygen), which is an oxidant required for an electrochemical reaction, to the fuel cell stack, a thermal/water management system (TMS) that discharges reaction heat of the fuel cell stack to outward of the system, controls an operating temperature of the fuel cell stack, and performs a water management function, and a fuel cell system controller that controls overall operations of the fuel cell system.

In such a configuration, the fuel cell system generates electricity by reacting the hydrogen, which is the fuel, with the oxygen in the air, and discharges heat and water as reaction by-products.

A fuel cell type, which attracts the most attention for the use of vehicles, is a proton exchange membrane fuel cell (or a polymer electrolyte membrane fuel cell, PEMFC) having the highest power density among fuel cells. The proton exchange membrane fuel cell has a short start-up time and a short power conversion reaction time because of a low operating temperature.

A fuel cell stack mounted in the proton exchange membrane fuel cell includes a membrane electrode assembly (MEA) in which each electrode/catalyst layer on which the electrochemical reaction occurs is attached to each of both sides of a polymer electrolyte membrane through which hydrogen ions move, a gas diffusion layer (GDL) that distributes reaction gases evenly and transfers generated electricity, a gasket and a fastener for maintaining airtightness and a proper fastening pressure between the reaction gases and cooling water, and a bipolar plate for moving the reaction gases and the cooling water. When the hydrogen and the oxygen are supplied, the fuel cell stack generates a current by a fuel cell reaction.

Such a fuel cell system should maintain a concentration of hydrogen gas in exhaust gas equal to or below a predetermined reference value to minimize risk of explosion or ignition because of the hydrogen gas in the exhaust gas.

However, hydrogen gas discharged through a hydrogen purge valve of the fuel cell system and hydrogen gas in a cathode caused by a cross over phenomenon may be discharged through an air exhaust line. In this connection, the cross over phenomenon means a phenomenon in which hydrogen gas in an anode diffuses into the cathode because of a difference in gas concentration between the anode and the cathode in the fuel cell stack.

A permissible concentration of the hydrogen gas discharged from the fuel cell system should be less than 8% and a 3-second measurement average should not exceed 4% based on a global technical regulation (GTR) currently applied worldwide.

Therefore, a fuel cell vehicle using the hydrogen as the fuel should always discharge exhaust gas having a hydrogen concentration equal to or below a certain level under all driving conditions.

The description in this background section is for improving understanding of the background of the disclosure, which may include matters other than the prior art already known to those skilled in the field to which such technology belongs.

SUMMARY

The present disclosure has been made to solve the above-mentioned problems occurring in the industry while the advantages achieved are maintained intact.

An aspect of the present disclosure provides an apparatus and a method for controlling a concentration of exhaust hydrogen in a fuel cell system that opens an air exhaust valve when starting to supply hydrogen to a fuel cell stack, drives an air compressor to supply air to an air exhaust line, and opens an air cut-off valve when the hydrogen supply is completed, thereby reducing a concentration of hydrogen discharged from a cathode using the air in the air exhaust line.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a concentration of exhaust hydrogen in a fuel cell system includes an air exhaust valve for discharging hydrogen from a cathode in a fuel cell stack to outside through an air exhaust line, an air compressor for supplying ambient air to the air exhaust line, an air cut-off valve for blocking air supplied to the cathode, and a controller that opens the air exhaust valve and drive the air compressor when starting to supply hydrogen to the fuel cell stack, and opens the air cut-off valve such that a concentration of the hydrogen discharged from the cathode is reduced by air in the air exhaust line when the hydrogen supply is completed.

In one embodiment, the apparatus may further include a memory for storing a table with a recorded opening speed of the air cut-off valve corresponding to the concentration of the hydrogen in the cathode of the fuel cell stack.

In one embodiment, the apparatus may further include a memory for storing a table with a recorded opening speed of the air cut-off valve corresponding to at least one of a hydrogen purge amount, the number of times of hydrogen purge, and the concentration of the hydrogen in the cathode of the fuel cell stack.

In one embodiment, the controller may adjust an opening speed of the air cut-off valve based on the concentration of the hydrogen in the cathode of the fuel cell stack.

In one embodiment, the controller may adjust an opening speed of the air cut-off valve based on at least one of a hydrogen purge amount, the number of times of hydrogen purge, and the concentration of the hydrogen in the cathode of the fuel cell stack.

In one embodiment, the controller may reduce the concentration of the hydrogen discharged from the cathode using the air in the air exhaust line in one of a normal start-up process, a cold start-up process, and a fuel cell stop mode release process during traveling of the fuel cell system.

In one embodiment, the controller may operate the air compressor to a maximum for raising a temperature of the fuel cell stack when reducing the concentration of the hydrogen discharged from the cathode using the air in the air exhaust line in the cold start-up process.

In one embodiment, the controller may complete a start-up of the fuel cell stack when a performance of the fuel cell stack is identified as normal.

According to another aspect of the present disclosure, a method for controlling a concentration of exhaust hydrogen in a fuel cell system includes opening an air exhaust valve to discharge air in an air exhaust line when beginning to supply hydrogen to a fuel cell stack, driving an air compressor to supply ambient air to the air exhaust line, and opening an air cut-off valve for blocking air supplied to a cathode of the fuel cell stack such that a concentration of the hydrogen discharged from the cathode of the fuel cell stack is reduced by the air in the air exhaust line when the hydrogen supply is completed.

In one embodiment, the method may further include storing, in memory, a table with a recorded opening speed of the air cut-off valve corresponding to the concentration of the hydrogen in the cathode of the fuel cell stack.

In one embodiment, the method may further include storing, in memory, a table with a recorded opening speed of the air cut-off valve corresponding to at least one of a hydrogen purge amount, the number of times of hydrogen purge, and the concentration of the hydrogen in the cathode of the fuel cell stack.

In one embodiment, the opening of the air cut-off valve may include adjusting an opening speed of the air cut-off valve based on the concentration of the hydrogen in the cathode of the fuel cell stack.

In one embodiment, the opening of the air cut-off valve may include adjusting an opening speed of the air cut-off valve based on at least one of a hydrogen purge amount, the number of times of hydrogen purge, and the concentration of the hydrogen in the cathode of the fuel cell stack.

According to another aspect of the present disclosure, a method for controlling a concentration of exhaust hydrogen in a fuel cell system includes, in one of a normal start-up process, a cold start-up process, and a fuel cell stop mode release process during traveling of the fuel cell system, opening an air exhaust valve to discharge air in an air exhaust line when starting to supply hydrogen to a fuel cell stack, driving an air compressor to supply ambient air to the air exhaust line, and opening an air cut-off valve for blocking air supplied to a cathode of the fuel cell stack such that a concentration of the hydrogen discharged from the cathode of the fuel cell stack is reduced by the air in the air exhaust line when the hydrogen supply is completed.

In one embodiment, the method may further include operating the air compressor to a maximum for raising a temperature of the fuel cell stack in the cold start-up process of the fuel cell system.

In one embodiment, the method may further include completing a start-up of the fuel cell stack when a performance of the fuel cell stack is identified as normal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
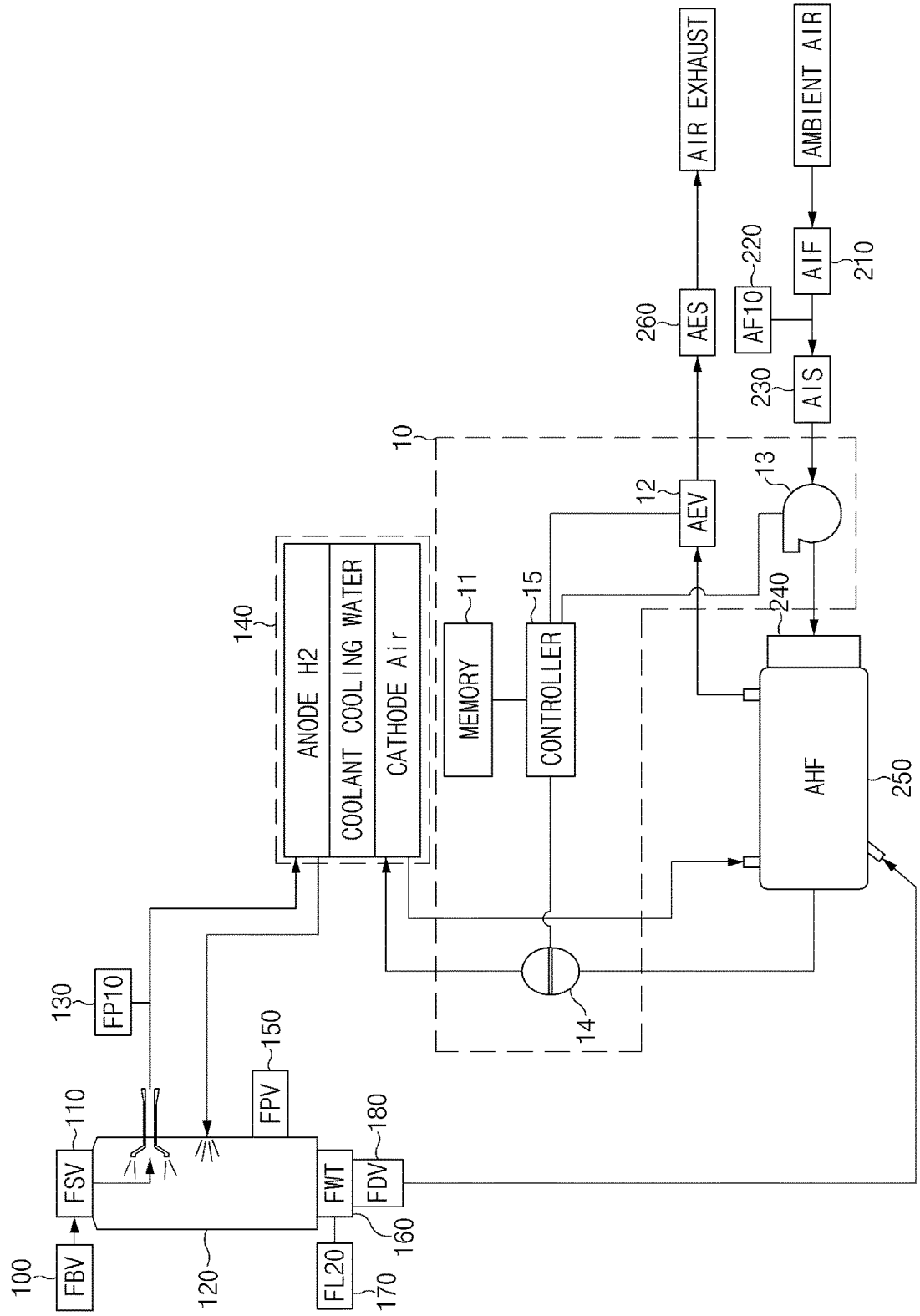
FIG. 1 is a block diagram of an apparatus for controlling a concentration of exhaust hydrogen in a fuel cell system according to one embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of an apparatus for controlling a concentration of exhaust hydrogen in a fuel cell system according to one embodiment of the present disclosure.

As shown in FIG. 1, an exhaust hydrogen concentration controlling apparatus 10 of a fuel cell system according to an embodiment of the present disclosure may include a memory 11, an air exhaust valve 12, an air compressor 13, an air cut-off valve 14, and a controller 15. In this connection, depending on a scheme of executing the exhaust hydrogen concentration controlling apparatus 10 of the fuel cell system according to an embodiment of the present disclosure, components may be coupled to each other to be implemented as a single component, or some components may be omitted.

Each of the components will be further described. First, the memory 11 may store various logics, algorithms, and programs required in processes of opening the air exhaust valve 12 when starting to supply hydrogen to a fuel cell stack 140, supplying air to an air exhaust line by driving the air compressor 13, and reducing a concentration of hydrogen discharged from a cathode by air in the air exhaust line by opening the air cut-off valve 14 when the supply of the hydrogen is completed. In this connection, the air exhaust line means a passage for connecting a humidifier 250, an AEV 12, and an AES 260 with each other from an output terminal of the cathode.

The memory 11 may store an opening speed model (a table) of the air cut-off valve 14 for adjusting a concentration of hydrogen in the air exhaust line. That is, the memory 11 may store a table in which an opening speed (a speed value) of the air cut-off valve 14 corresponding to a concentration of hydrogen in the cathode is recorded. In this connection, the opening speed value of the air cut-off valve 14 corresponding to the concentration of the hydrogen in the cathode is a value in consideration of a hydrogen purge amount, the number of times of hydrogen purge, and the like.

The memory 11 may include at least one type of a storage medium of at least one type of memory such as a flash memory type, a hard disk type, a micro type, and a card type (for example, an SD card (Secure Digital Card) or an XD card (eXtream Digital Card)) memory, and the like, and a RAM (Random Access Memory), SRAM (Static RAM), ROM (Read Only Memory), PROM (Programmable ROM), EEPROM (Electrically Erasable PROM), MRAM (Magnetic RAM), a magnetic disk, and an optical disk type memory.

The air exhaust valve 12 serves to discharge the hydrogen from the cathode to outside through the air exhaust line.

The air compressor 13 serves to supply ambient air to the humidifier 250.

The air cut-off valve 14 serves to block air supplied to the cathode of the fuel cell stack 140.

The controller 15 performs overall control such that each of the components may perform a function thereof normally. The controller 15 may be implemented in the form of hardware, software, or in a combination of the hardware and the software. Preferably, the controller 15 may be implemented as a microprocessor, but may not be limited thereto.

In particular, the controller 15 may perform various controls in the processes of opening the air exhaust valve 12 when starting to supply the hydrogen to the fuel cell stack 140, supplying the air to the air exhaust line by driving the air compressor 13, and reducing the concentration of the hydrogen discharged from the cathode by the air in the air exhaust line by opening the air cut-off valve 14 when the supply of the hydrogen is completed.

When receiving a command to start the fuel cell system from a user, the controller 15 may control a hydrogen supplier to supply the hydrogen to the fuel cell stack 140, open the air exhaust valve 12, and drive an air compressor 240. Through such processes, ambient air is supplied to the air exhaust line.

The controller 15 may open the air cut-off valve 14 when the supply of the hydrogen to the fuel cell stack 140 is complete. In this process, the concentration of the hydrogen flowed into the air exhaust line from the cathode of the fuel cell stack 140 is reduced because of the air in the exhaust line.

The controller 15 may adjust the opening speed of the air cut-off valve 14 to control the concentration of the hydrogen in the air exhaust line. For example, when the concentration of the hydrogen in the cathode is high, the opening speed of the air cut-off valve 14 may be lowered, and when the concentration of the hydrogen in the cathode is low, the opening speed of the air cut-off valve 14 may be increased. In another example, the opening speed of the air cut-off valve 14 may be adjusted based on the table in which the opening speed of the air cut-off valve 14 corresponding to the concentration of the hydrogen in the cathode stored in the memory 11 is recorded. In this connection, a technology itself of estimating the concentration of the hydrogen in the cathode is not the subject of the present disclosure and is a technology commonly used in the fuel cell system, so that a detailed description thereof will be omitted.

The controller 15 may also adjust the opening speed of the air cut-off valve 14 by further considering the hydrogen purge amount, the number of times of hydrogen purge, and the like.

In one example, the hydrogen supplier of the fuel cell system may include an FBV 100, an FSV 110, an FEJ 120, an FP10 130, an FPV 150, an FWT 160, an FL20 170, and an FDV 180.

The FBV 100, which is a hydrogen block valve (a fuel block valve), serves to block the hydrogen supplied to the fuel cell stack 140.

The FSV 110, which is a hydrogen supply valve (a fuel supply valve), serves to adjust a pressure of the hydrogen supplied to the fuel cell stack 140.

The FEJ 120, which is a hydrogen ejector (a fuel ejector), serves to apply a pressure on the hydrogen and supply the hydrogen to the fuel cell stack 140.

The pressure sensor 130 serves to measure the pressure of the hydrogen supplied to the fuel cell stack 140.

The FPV 150, which is a fuel line purge valve, serves to discharge hydrogen electrode condensate water and impurities in the fuel cell stack 140.

The FWT 160, which is a water trap (a fuel-line water trap), serves to store water.

The FL20 170, which is a water level measurement sensor (a fuel-line level sensor), serves to measure a level of the water stored in the FWT 160.

The FDV 180, which is a water discharge valve (a fuel-line drain valve), serves to discharge the water stored in the FWT 160.

In addition, the air supplier of the fuel cell system may include an AIF 210, an AF10 220, an AIS 230, the air cooler 240, the humidifier 250, and the AES 260.

The AIF 210, which is an air intake filter, filters foreign substances (dust and the like) contained in the ambient air.

The AF10 220 is a sensor (an air flow sensor) for measuring a flow rate of the air.

The AIS 230 is a type of silencer (an air intake silencer) that removes noise of intake air.

The air cooler 240 serves to cool the air supplied to the humidifier 250.

The humidifier 250 serves to adjust a humidity of the air.

The AES 260 is a kind of silencer (an air exhaust silencer) for removing noise generated when exhaust gas is discharged through the air exhaust line.

Figure 2:
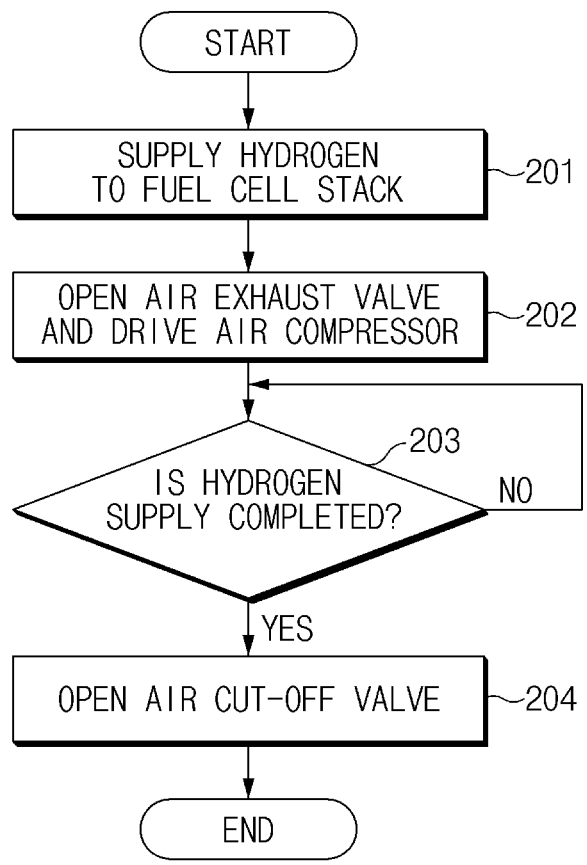
FIG. 2 is a flowchart for a method for controlling a concentration of exhaust hydrogen in a fuel cell system according to one embodiment of the present disclosure.

FIG. 2 is a flowchart for a method for controlling a concentration of exhaust hydrogen in a fuel cell system according to one embodiment of the present disclosure.

First, the controller 15 receives the command to start the fuel cell from the user (201).

Thereafter, the controller 15 controls the hydrogen supplier to supply the hydrogen to the fuel cell stack 140 and also opens the air exhaust valve 12 to drive the air compressor 240 (202). Through such processes, the ambient air is supplied to the air exhaust line (an ACV bypass air supply step).

Thereafter, when the supply of the hydrogen to the fuel cell stack 140 is completed (203), the controller 15 opens the air cut-off valve 14 (204). In such process, the hydrogen flowed into the air exhaust line from the cathode of the fuel cell stack 140 is discharged to the outside while the concentration thereof is reduced because of the air in the air exhaust line (a crossover hydrogen exhaust step).

In this connection, the controller 15 may adjust the opening speed of the air cut-off valve 14 to adjust the concentration of the hydrogen in the air exhaust line. That is, the controller 15 may adjust the opening speed of the air cut-off valve 14 based on the table in which the opening speed of the air cut-off valve 14 corresponding to the concentration of the hydrogen in the cathode is recorded.

In general, in the fuel cell system, when the air cut-off valve 14 is opened, hydrogen purge logic is performed to secure a stable performance of the fuel cell, so that the concentration of the hydrogen in the air exhaust line may be increased.

In an embodiment of the present disclosure, the table in which the opening speed of the air cut-off valve 14 is recorded may be generated in consideration of such a situation. That is, the table in which the opening speed of the air cut-off valve 14 corresponding to the concentration of the hydrogen in the cathode is recorded may further store an opening speed of the air cut-off valve 14 in consideration of the concentration of the hydrogen in the air exhaust line based on the performance of the hydrogen purge logic.

In one example, the method for controlling the concentration of the exhaust hydrogen in the fuel cell system according to an embodiment of the present disclosure may be applied not only to a normal start-up but also to a cold start-up of a fuel cell vehicle, and may be equally applied when deactivating a fuel cell stop mode while the fuel cell vehicle is traveling.

Hereinafter, sequences for processes of controlling the concentration of the exhaust hydrogen in the fuel cell system according to an embodiment of the present disclosure during the normal start-up, the cold start-up, and when deactivating the fuel cell stop mode during the traveling will be described with reference to FIGS. 3 to 5.

Figure 3:
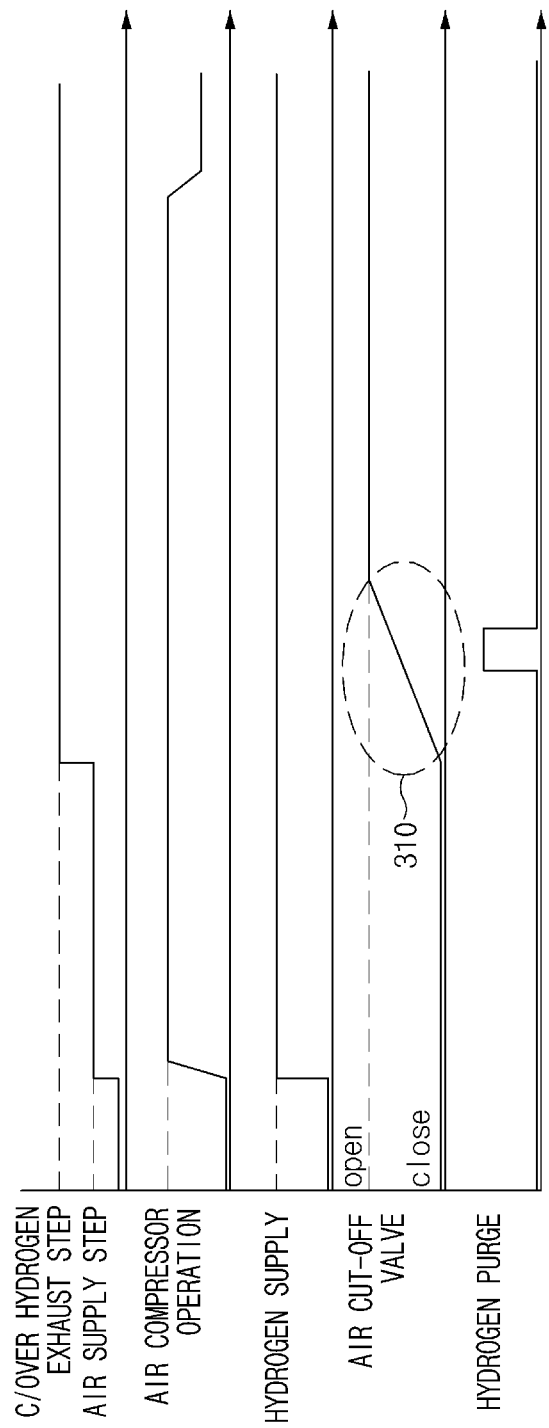
FIG. 3 is a view illustrating a sequence for a case in which a method for controlling a concentration of exhaust hydrogen in a fuel cell system according to one embodiment of the present disclosure is applied to a normal start-up.

FIG. 3 is a view illustrating a sequence for a case in which a method for controlling a concentration of exhaust hydrogen in a fuel cell system according to one embodiment of the present disclosure is applied to a normal start-up.

First, as the ACV bypass air supply step, the hydrogen is supplied to the fuel cell stack 140, the air exhaust valve 12 is opened (not shown), and the air compressor 240 is driven.

Thereafter, as the crossover hydrogen exhaust step, the air cut-off valve 14 is opened (310). In this connection, the opening speed of the air cut-off valve 14 reflects not only the concentration of the hydrogen in the cathode but also the number of times of hydrogen purge.

Figure 4:
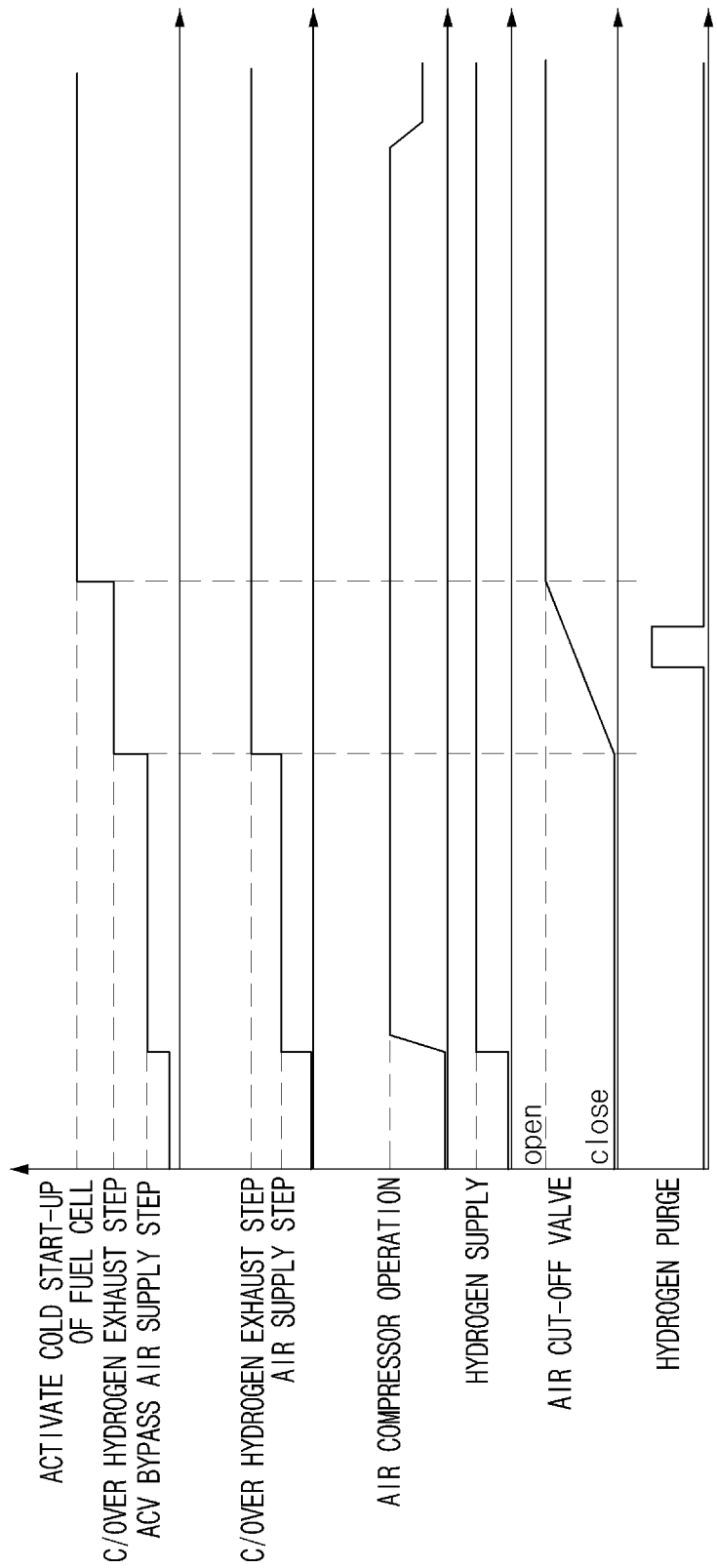
FIG. 4 is a view illustrating a sequence for a case in which a method for controlling a concentration of exhaust hydrogen in a fuel cell system according to one embodiment of the present disclosure is applied to a cold start-up.

FIG. 4 is a view illustrating a sequence for a case in which a method for controlling a concentration of exhaust hydrogen in a fuel cell system according to one embodiment of the present disclosure is applied to a cold start-up.

As shown in FIG. 4, the cold start-up is generally similar to the normal start-up.

First, as the ACV bypass air supply step, the hydrogen is supplied to the fuel cell stack 140, the air exhaust valve 12 is opened (not shown), and the air compressor 240 is driven.

Thereafter, as the crossover hydrogen exhaust step, the air cut-off valve 14 is opened (310). In this connection, the opening speed of the air cut-off valve 14 reflects not only the concentration of the hydrogen in the cathode but also the number of times of hydrogen purge.

Thereafter, when the air cut-off valve 14 is opened, a cold start-up mode is activated.

Figure 5:
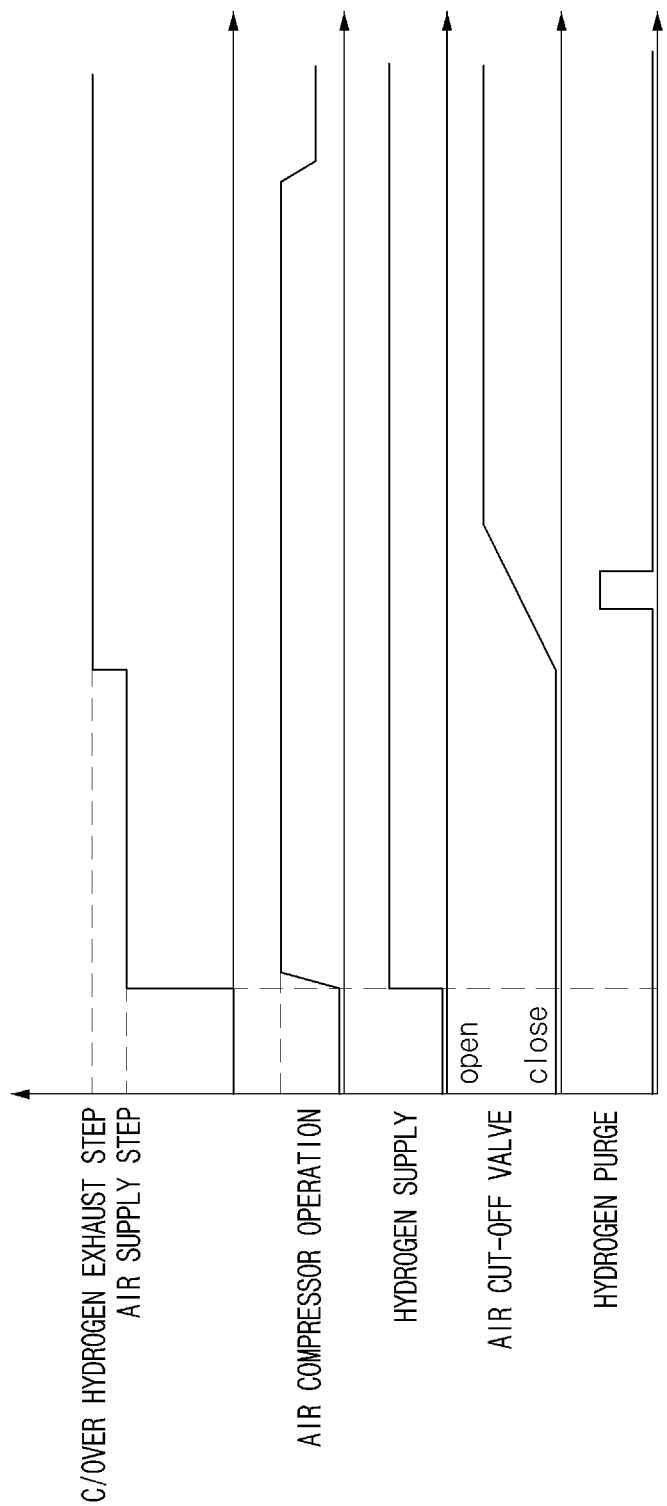
FIG. 5 is a view illustrating a sequence for a case in which a method for controlling a concentration of exhaust hydrogen in a fuel cell system according to one embodiment of the present disclosure is applied when deactivating a fuel cell stop mode during traveling.

FIG. 5 is a view illustrating a sequence for a case in which a method for controlling a concentration of exhaust hydrogen in a fuel cell system according to one embodiment of the present disclosure is applied when deactivating a fuel cell stop mode during traveling.

In general, the fuel cell vehicle operates in a FC stop mode, which stops the fuel cell when energy from the fuel cell is unnecessary while traveling.

Thereafter, the fuel cell vehicle operates in a FC stop release mode when the energy is required from the fuel cell. In this connection, a sequence may be the same as the sequence of the normal start-up.

Figure 6:
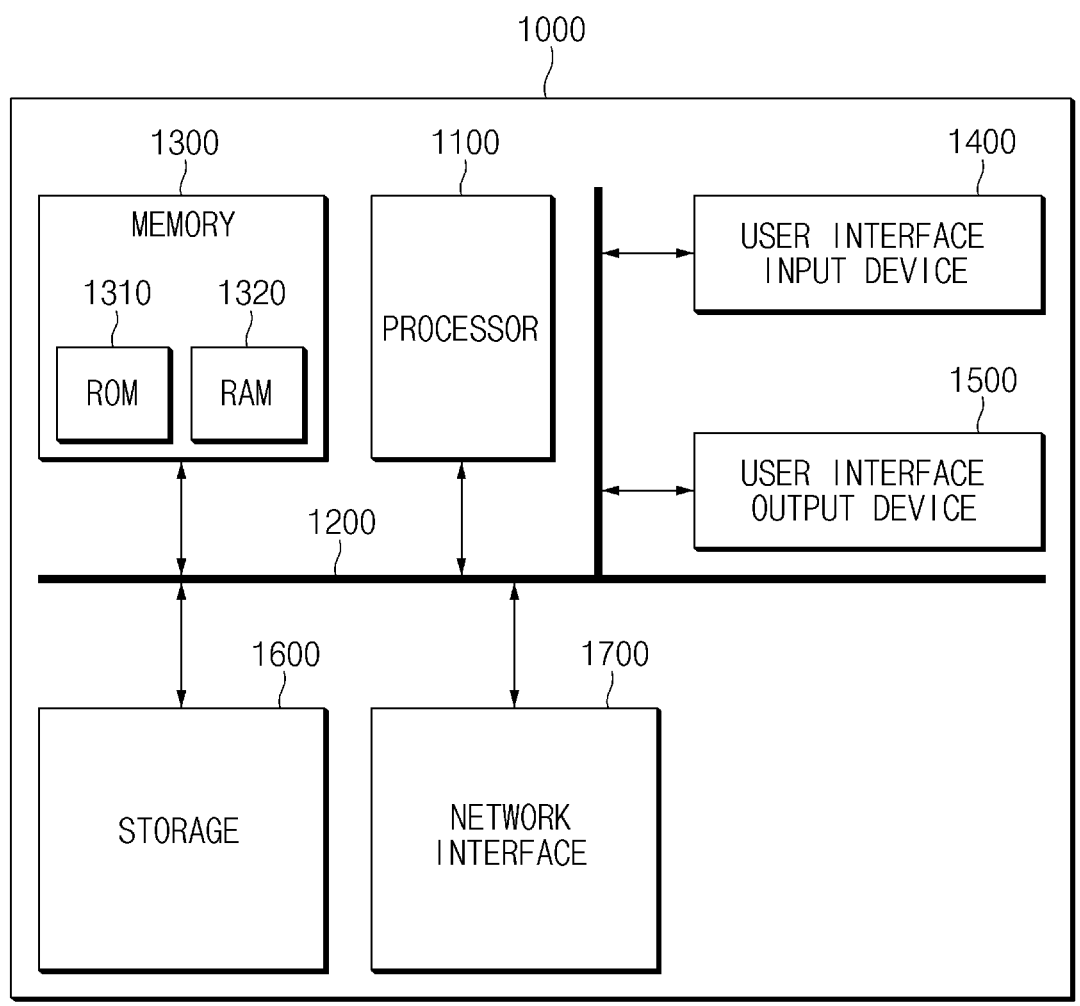
FIG. 6 is a block diagram illustrating a computing system for executing a method for controlling a concentration of exhaust hydrogen in a fuel cell system according to one embodiment of the present disclosure.

FIG. 6 is a block diagram illustrating a computing system for executing a method for controlling a concentration of exhaust hydrogen in a fuel cell system according to one embodiment of the present disclosure.

With reference to FIG. 6, the method for controlling the concentration of the exhaust hydrogen in the fuel cell system according to an embodiment of the present disclosure described above may also be implemented through a computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical concepts of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the method for controlling the concentration of the exhaust hydrogen of the fuel cell vehicle according to an embodiment of the present disclosure, the air exhaust valve is opened when starting to supply the hydrogen to the fuel cell stack, the air compressor is driven to supply the air to the air exhaust line, and the air cut-off valve is opened when the hydrogen supply is completed, thereby reducing the concentration of the hydrogen discharged from the cathode using the air in the air exhaust line.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure recited in the following claims.

What is claimed is:

1. An apparatus for controlling a concentration of exhaust hydrogen in a fuel cell system, the apparatus comprising:
   an air exhaust valve for discharging hydrogen from a cathode in a fuel cell stack to an outside environment through an air exhaust line;
   an air compressor for supplying ambient air to the exhaust line;
   an air cut-off valve for blocking air supplied to the cathode; and
   a controller configured to:
      open the air exhaust valve and drive the air compressor when starting to supply hydrogen to the fuel cell stack; and
      after the hydrogen supply is completed, open the air cut-off valve such that a concentration of the hydrogen discharged from the cathode is reduced by air in the exhaust line.

2. The apparatus of claim 1, further comprising:
   memory for storing a table with a recorded opening speed of the air cut-off valve corresponding to the concentration of the hydrogen in the cathode of the fuel cell stack.

3. The apparatus of claim 1, further comprising:
   memory for storing a table with a recorded opening speed of the air cut-off valve corresponding to at least one of a hydrogen purge amount, the number of times of hydrogen purge, and the concentration of the hydrogen in the cathode of the fuel cell stack.

4. The apparatus of claim 1, wherein the controller is configured to adjust an opening speed of the air cut-off valve based on the concentration of the hydrogen in the cathode of the fuel cell stack.

5. The apparatus of claim 1, wherein the controller is configured to adjust an opening speed of the air cut-off valve based on at least one of a hydrogen purge amount, the number of times of hydrogen purge, as well as the concentration of the hydrogen in the cathode of the fuel cell stack.

6. The apparatus of claim 1, wherein the controller is configured to reduce the concentration of the hydrogen discharged from the cathode using the air in the air exhaust line in one of a normal start-up process, a cold start-up process, and a fuel cell stop mode release process during traveling of the fuel cell system.

7. The apparatus of claim 6, wherein the controller is configured to operate the air compressor to a maximum for raising a temperature of the fuel cell stack when reducing the concentration of the hydrogen discharged from the cathode using the air in the air exhaust line in the cold start-up process.

8. The apparatus of claim 7, wherein the controller is configured to complete a start-up of the fuel cell stack when a performance of the fuel cell stack is identified as normal.

9. A method for controlling a concentration of exhaust hydrogen in a fuel cell system, the method comprising:
   opening an air exhaust valve to discharge air in an air exhaust line when starting to supply hydrogen to a fuel cell stack;
   driving an air compressor to supply ambient air to the air exhaust line; and
   after the hydrogen supply is completed, opening an air cut-off valve for blocking air supplied to a cathode of the fuel cell stack such that a concentration of the hydrogen discharged from the cathode of the fuel cell stack is reduced by the air in the air exhaust line.

10. The method of claim 9, further comprising:
    storing, in memory, a table with a recorded opening speed of the air cut-off valve corresponding to the concentration of the hydrogen in the cathode of the fuel cell stack.

11. The method of claim 10, wherein the memory further includes the table with the recorded opening speed of the air cut-off valve further considering at least one of a hydrogen purge amount and the number of times of hydrogen purge.

12. The method of claim 9, wherein the opening of the air cut-off valve includes:
    adjusting an opening speed of the air cut-off valve based on the concentration of the hydrogen in the cathode of the fuel cell stack.

13. The method of claim 9, wherein the opening of the air cut-off valve includes:
    adjusting an opening speed of the air cut-off valve in consideration of at least one of a hydrogen purge amount and the number of times of hydrogen purge as well as the concentration of the hydrogen in the cathode of the fuel cell stack.

14. A method for controlling a concentration of exhaust hydrogen in a fuel cell system, the method comprising:
    in one of a normal start-up process, a cold start-up process, and a fuel cell stop mode release process during traveling of the fuel cell system,
    opening an air exhaust valve to discharge air in an air exhaust line when starting to supply hydrogen to a fuel cell stack;
    driving an air compressor to supply ambient air to the air exhaust line; and
    after the hydrogen supply is completed, opening an air cut-off valve for blocking air supplied to a cathode of the fuel cell stack such that a concentration of the hydrogen discharged from the cathode of the fuel cell stack is reduced by the air in the air exhaust line.

15. The method of claim 14, further comprising:
operating the air compressor to a maximum for raising a temperature of the fuel cell stack in the cold start-up process of the fuel cell system.

16. The method of claim 15, further comprising:
completing a start-up of the fuel cell stack when a performance of the fuel cell stack is identified as normal.

\* \* \* \* \*